(12) United States Patent
Nielsen

(10) Patent No.: US 9,869,293 B2
(45) Date of Patent: Jan. 16, 2018

(54) WIND TURBINE TOWER GUIDE SYSTEM, AND A METHOD FOR INSTALLING AN INSTALLATION UNIT

(71) Applicant: Vestas Wind Systems A/S, Aarhus N (DK)

(72) Inventor: Ben Moller Nielsen, Lystrup (DK)

(73) Assignee: Vestas Wind Systems A/S, Aarhus N. (DK)

( * ) Notice: Subject to any disclaimer, the term of this patent is extended or adjusted under 35 U.S.C. 154(b) by 323 days.

(21) Appl. No.: 14/654,093

(22) PCT Filed: Dec. 19, 2013

(86) PCT No.: PCT/DK2013/050450
§ 371 (c)(1),
(2) Date: Jun. 19, 2015

(87) PCT Pub. No.: WO2014/094792
PCT Pub. Date: Jun. 26, 2014

(65) Prior Publication Data
US 2015/0345463 A1 Dec. 3, 2015

Related U.S. Application Data

(60) Provisional application No. 61/740,460, filed on Dec. 21, 2012.

(30) Foreign Application Priority Data

Dec. 20, 2012 (DK) ................................ 2012 70805

(51) Int. Cl.
*F03D 1/00* (2006.01)
*F03D 11/00* (2006.01)
(Continued)

(52) U.S. Cl.
CPC ............. *F03D 1/001* (2013.01); *F03D 13/10* (2016.05); *F03D 13/20* (2016.05); *F03D 80/82* (2016.05);
(Continued)

(58) Field of Classification Search
CPC ...... F03D 1/001; F03D 11/0058; F03D 11/04; F03D 13/10; F03D 13/20; F03D 80/82;
(Continued)

(56) References Cited

U.S. PATENT DOCUMENTS 6,601,649 B2 * 8/2003 Beato ..................... B63B 21/50
166/352
7,234,409 B2 * 6/2007 Hansen ................ B63B 25/002
114/258

(Continued)

FOREIGN PATENT DOCUMENTS

| EP | 1788242 A1 | 5/2007 |
| EP | 2187050 A2 | 5/2010 |

(Continued)

OTHER PUBLICATIONS

Danish Patent and Trademark Office, Search Report issued in Application No. PA 2012 70805.

(Continued)

*Primary Examiner* — Igor Kershteyn
(74) *Attorney, Agent, or Firm* — Wood Herron & Evans LLP

(57) ABSTRACT

A wind turbine tower (10) with a guide system for guiding an internal installation unit (20) displaced relative to the inside of said tower (10) to a final mounting position inside said tower (10), said tower (10) having a first end (3) and an opposite second end (5), said first end (3) defining an entry opening for receiving said unit (20), said guide system comprising at least two parallel stays (32) for said guiding (Continued)

being mounted to the inside of the wall (8) of said tower (10) and extending from said first end (3) towards said second end (5), and engagement elements (35) mounted externally on said unit (20), said engagement elements (35) being configured for receiving a respective one of said stays (32).

29 Claims, 6 Drawing Sheets

(51) Int. Cl.
*F03D 11/04* (2006.01)
*F03D 80/80* (2016.01)
*F03D 13/20* (2016.01)
*F03D 13/10* (2016.01)

(52) U.S. Cl.
CPC ..... *F05B 2230/60* (2013.01); *F05B 2230/604* (2013.01); *F05B 2230/61* (2013.01); *F05B 2240/912* (2013.01); *Y02E 10/728* (2013.01); *Y02P 70/523* (2015.11); *Y10T 29/49828* (2015.01)

(58) Field of Classification Search
CPC ............ F05B 2230/60; F05B 2230/604; F05B 2230/61; F05B 2240/912; Y02E 10/728; Y02P 70/523; Y10T 29/49828
See application file for complete search history.

(56) References Cited

U.S. PATENT DOCUMENTS

| | | | | |
|---|---|---|---|---|
| 7,765,766 | B2* | 8/2010 | Gomez | E04H 12/12 52/742.16 |
| 8,281,547 | B2* | 10/2012 | Hettick | B29C 70/30 52/745.17 |
| 2002/0095878 | A1* | 7/2002 | Henderson | E04H 12/182 52/116 |
| 2010/0101173 | A1* | 4/2010 | Bagepalli | E04H 12/085 52/651.01 |
| 2011/0210233 | A1* | 9/2011 | Fang | F03D 13/20 248/673 |
| 2014/0147272 | A1* | 5/2014 | Donescu | F03D 11/045 416/1 |

FOREIGN PATENT DOCUMENTS

| | | |
|---|---|---|
| EP | 2522616 A1 | 11/2012 |
| WO | 03069099 A1 | 8/2003 |
| WO | 10015507 A2 | 2/2010 |
| WO | 2012130245 A2 | 10/2012 |

OTHER PUBLICATIONS

European Patent Office, Search Report and Written Opinion issued in International Application No. PCT/DK2013/050450 dated Mar. 13, 2014.

* cited by examiner

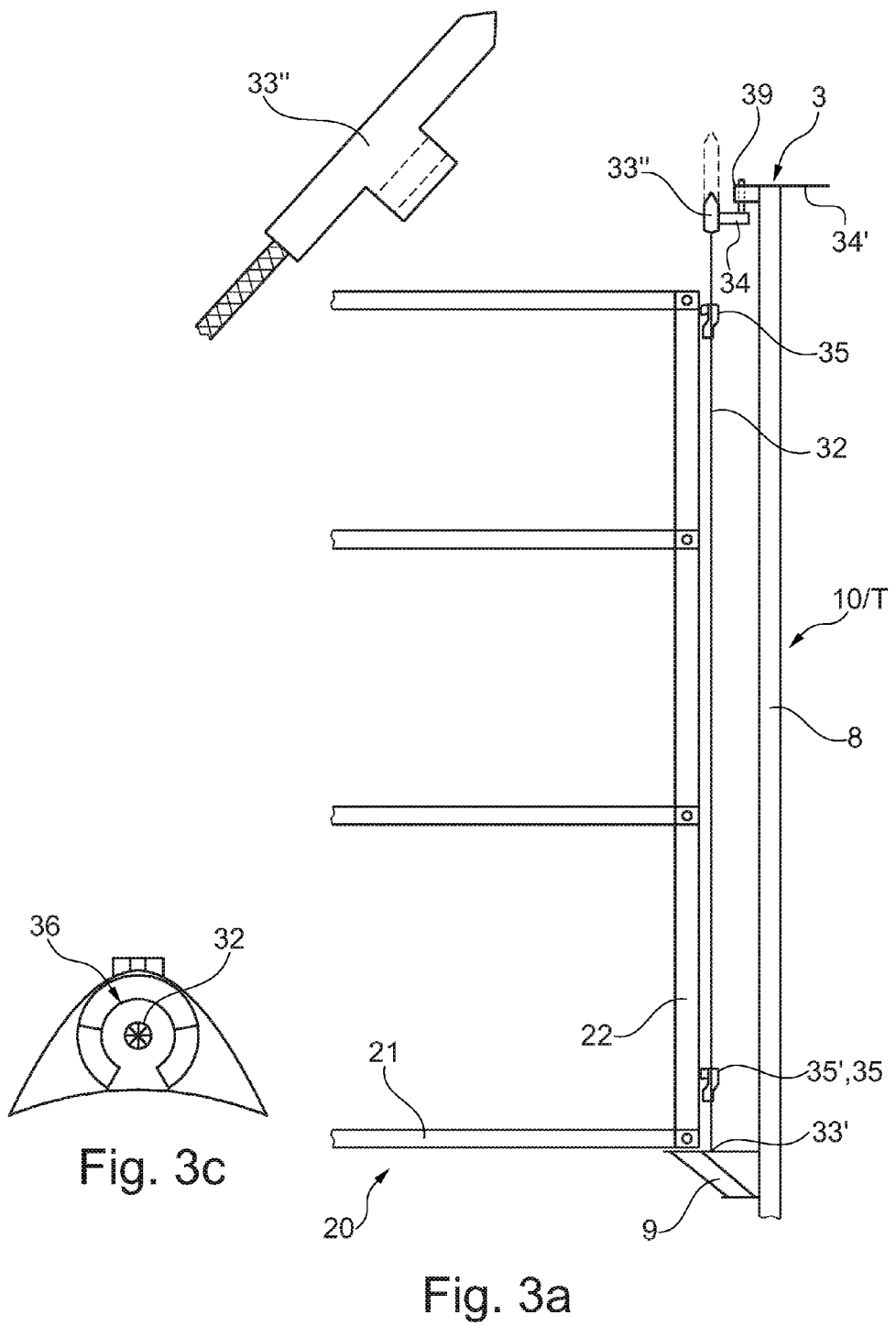

WIND TURBINE TOWER GUIDE SYSTEM, AND A METHOD FOR INSTALLING AN INSTALLATION UNIT

FIELD OF THE INVENTION

The present invention relates to the installation in a tower of an installation unit, in particular of an electrical component carrying frame structure lowered into the tower from above.

BACKGROUND OF THE INVENTION

Wind turbine plants typically include a tower and a rotor/turbine mounted on top of the tower. The rotor may include one or more blades that rotate about a center point when in the presence of wind. The rotor motion may then be converted to electrical or other energy by known means.

Many wind turbine towers include electrical machinery/equipment within them, such as for converting rotational energy from the rotor into electrical energy. The electrical machinery may include, for example, converter electronics, voltage switch gear and a transformer. In some cases these components or equipment are supported by a separate installation unit, and mounted in the tower by lowering the unit into the tower from the top thereof, to become surrounded by the tower.

Typically, as the installation unit is being lowered, technicians is located on internal tower levels to ensure that the unit does not contact and, thus, damage the tower wall and also to correctly align the installation unit with supporting abutments or projections deeper inside the tower. Because wind towers are typically located in areas having frequent wind currents, it is common for wind gusts to move the installation unit as it is being lowered. This could lead to injury of the personnel if contacted by the installation unit.

OBJECT OF THE INVENTION

It is an object of the present invention to reduce the risk of personnel injury by providing an alternative to the prior art. Damage to the aforementioned equipment, such as damage that may occur as the installation unit moves past inward flanges on the tower, may also be prevented.

In particular, it may be seen as an object of the present invention to reduce this risk in a highly simple manner which does not require significant structural modifications to existing towers.

SUMMARY OF THE INVENTION

Thus, the above described object and several other objects are intended to be obtained in a first aspect of the invention by providing a wind turbine tower as such, with a guide system useful for guiding an internal installation module displaced relative to the inside of the tower to a final mounting position inside the tower, the tower having a first end and an opposite second end, the first end defining an entry opening for receiving the module, at least two parallel stays for the guiding being in accordance with the invention mounted to the inside of the wall of the tower and extending from the first end towards the second end.

A further independent claim is also directed a wind turbine tower with a guide system for guiding an internal installation module displaced relative to the inside of the tower structure to a final mounting position inside the tower structure, the tower having a first end and an opposite second end, the first end defining an entry opening for receiving the module, the guide system comprising in accordance with the invention a) at least two parallel stays for the guiding being mounted to the inside of the wall of the tower and extending from the first end towards the second end, and b) engagement elements mounted externally on the module, the engagement elements being configured for receiving a respective one of the stays as the installation module is being displaced in relation to the tower, such as by being lowered into the tower by a crane. Sliding contact of the engagement elements with the stays arise when the engagement elements are in contact with the stays; such contact may arise temporarily only when wind gust or other events bring the installation unit out of proper alignment.

The invention also concerns a method for installing an installation unit in a tower having the aforementioned stays mounted to the inside wall of the tower, and comprising the steps of a) providing an installation unit with the electrical equipment, engagement elements being mounted externally on the installation unit, b) advancing the installation unit towards a first end of the tower, c) bringing the engagement elements into contact with the stays, and d) displacing the installation unit into the tower, with the engagement elements aligned with the stays.

The engagement elements may be configured for releasably receiving the stays, such as by only partial enclosing the stays. Thus sideways movements of the installation unit may take place while rotation of the installation unit about a centre line of the tower is still restricted by the partial enclosing. In addition, the stays may be mounted so as to project from the end of the tower, whereby a guiding of the installation unit will take place before it enters the tower; the end of the stays may be configured to cooperate with a lead-in portion of the engagement elements, such as to bring about a rotation of the installation unit with respect to the tower.

In one embodiment of the invention where the tower has a peripheral flange with bolt-holes for connecting the tower with another part of a wind turbine plant, the stays are connected to the flange, and extend at a distance from the flange. Deeper inside the tower the stays may be anchored to abutments or support for supporting the installation unit in its final position.

By using stays in the form of cables, preferably under some tension, the installation unit may bounce slightly off the stays if it moves sideways during the lowering as a result of a wind gust, whereby the stays will absorb energy, providing a further protection against damage to the tower or installation unit.

The term "tower" as used refers without limitation to a structure extending from a foundation and having an end whereto a rotor is mounted, and also to a structure configured to have an installation module and to which a second structure is mounted, following which the rotor is mounted to the second structure.

BRIEF DESCRIPTION OF THE FIGURES

The invention will now be described in more detail with regard to the accompanying figures. The figures show one way of implementing the present invention and is not to be construed as being limiting to other possible embodiments falling within the scope of the attached claim set.

FIG. 3a is a schematic partial cross-sectional view of a tower having an installation module mounted inside, FIG. 3c is a top view showing the engagement illustrated schematically in FIG. 3b.

DETAILED DESCRIPTION OF AN EMBODIMENT

Figure 1:
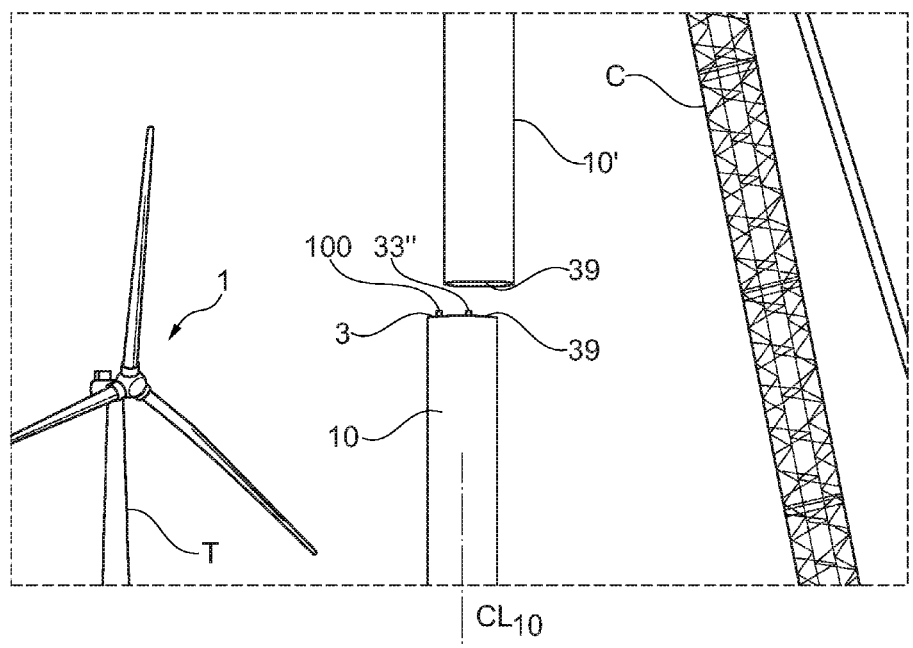
FIG. 1 is a schematic view showing the upper part of a wind turbine tower with a turbine, and a crane in the process of mounting a tower section onto another tower section.

FIG. 1 shows a step in the making in-situ of a tubular tower T including multiple segments 10, 10', wherein an upper tower section 10' is lowered towards a lower hollow tubular tower section 10 already in correct position. The two sections 10, 10' are then connected by bolts (not shown) passed through holes in abutting inwardly directed peripheral flanges 39 at the upper 3 and lower end, respectively, of the two tower sections 10, 10'. After assembly of the tower sections 10, 10' a turbine is mounted to the top of the tower T, concluding the erection of a wind energy plant 1.

Mounted in the tower T, such as in a lowermost tower structure or section 10, is an installation unit 20 carrying various components/equipment, such as electronics components or machinery of the wind energy plant 1. Such an installation unit 20 is shown by way of example in FIG. 2, at a step wherein the unit 20 is being lowered by a crane C into the interior of the tower 10 through the upper or first end 3, which is sized accordingly to define an installation unit entry-opening. After this procedure another or second tower structure or section 10' may be put in place on top, as shown in FIG. 1. The tower T will normally have an essentially circular cross-section; in some cases it may be preferred to form a tower section with an increased internal diameter towards the lower or second end 5 thereof.

In some cases the installation unit may alternatively have been preinstalled on a base following which the tower or a lower tower structure or section 10 is lowered by the crane C to receive and surround the installation unit through the lower or second end 5; the present invention will also be useful in such a case but will in the following be described in the context of the assembly procedure shown in FIG. 2.

The installation module 20 typically is a multi-level frame structure having vertical supports 22, 22', horizontal beams 21, and a floor plate 23 at each level, the floor plates 23 carrying the various components referred to above. Often, the floor plate 23 has an essentially circular outline, with a diameter less than the diameter of the tower at the first end 3, possibly with cut-away portions for a vertically running hoisting mechanism. The vertical supports 22, 22' may run through the floor plates 23 at a position which may be spaced slightly inwards from the periphery of the circular floor plate 23. Viewed from above the installation unit 20 has a foot print F, typically corresponding to the contour of the floor plate 23.

According to the present invention engagement elements 35 for slidingly engaging internal vertical stays 32 to be discussed further below may be mounted to the floor plate 23 and/or to the vertical support 22 and/or to the horizontal beams 21 so as to project outwardly from the installation unit 20, normally beyond the foot print F. When the engagement elements 35 engages the aforementioned vertical stays 32 the rotational orientation of the installation unit 20 in relation to the centre line $CL_{10}$ of the tower or tower section 10 is maintained as the installation unit 20 is being lowered, with the engagement allowing a sliding along the stays 32 whenever a movement of the installation unit 20 brings the engagements elements 35 in direct contact with the stays 32. In addition, if the installation unit 20 moves slightly sideways during the lowering procedure it will strike the stays 32 and not the inside surface of the wall 8 or, as the case may be, the flange 39, of the tower 10, to which wall 8 the stays are mounted. Any distance between the stays 32 and the wall 8 will allow for the stays to absorb such a sideways movement by deformation towards the wall 8.

Figure 3B:
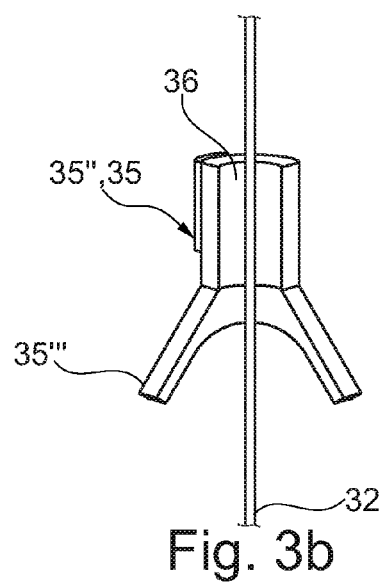
FIG. 3b is a perspective schematic front view showing a guiding stay engaged by an engagement element.

Reference will now be made to FIG. 3a-3d, for a description of an embodiment of the aforementioned stays 32. Shown in FIG. 3a is the wall 8 of the tower 10, with an installation unit 20 (shown in part only) received inside the tower T/10 and formed as a frame structure as discussed above, with projecting engagement elements or structures 35, preferably formed of metal, mounted thereto, preferably a plurality of such engagement elements 35 mounted below each other at different levels.

Figure 2:
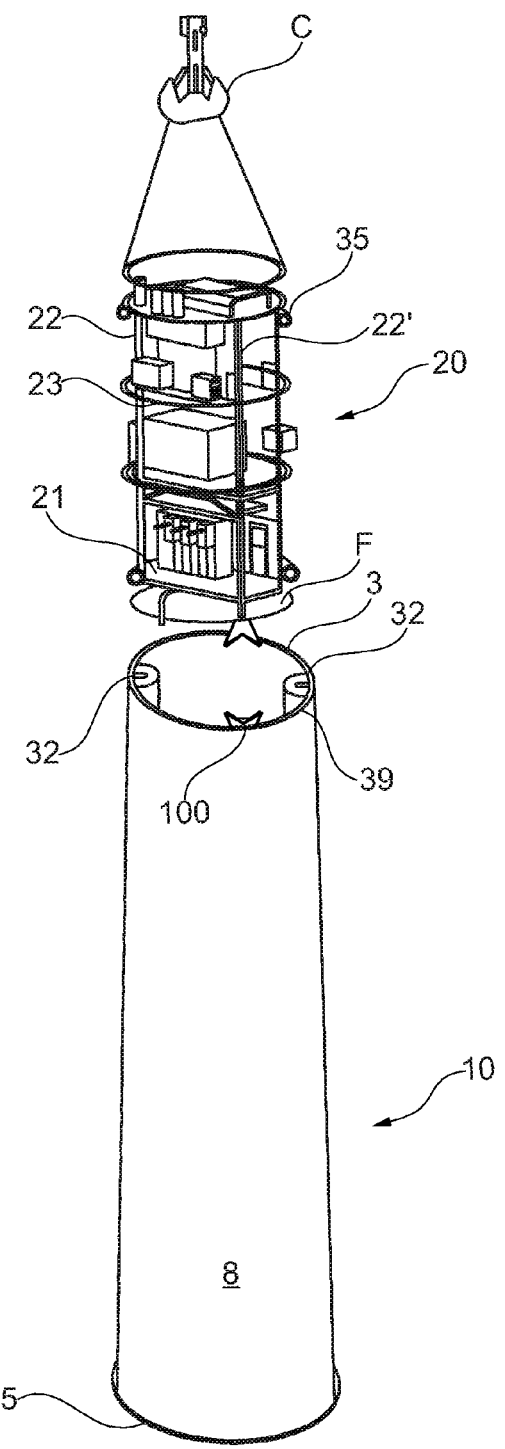
FIG. 2 is a schematic view showing a crane in the process of lowering an installation module into the inside of a tower or tower section.

Mounted diametrically opposite each other on the tower wall 8, as shown in the FIG. 2 embodiment, are two parallel stays 32 of which one is shown in FIG. 3a. More than two stays 32 may be used, extending vertically and essentially parallel to each other from the upper end 3 from desired locations along the periphery of the tower 10 at the upper end 3, i.e. not necessarily at diametrically opposite locations. Preferably, the stays are at the upper end 33" anchored to the inwardly directed peripheral flange 39 via a first arm 34 which may have a middle portion extending through one of the bolt holes of the flange 39. The middle portion may be connected to a second arm 34' for adjusting the position of the first arm 34 in relation to the wall 8, eg. such that the first arm 34 is oriented towards the centre line $CL_{10}$ of the tower 10. In this manner, the upper end 33" of the stays 32 may be located at a certain space from the inner face of the flange 39, which may be desired to even further facilitate lead-in of the stays 32, i.e. such that they are received by the engagement elements 35.

Figure 3D:
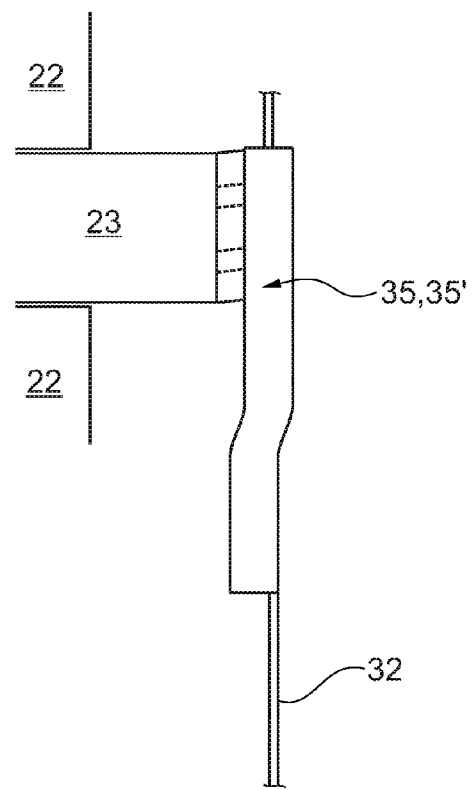
FIG. 3d is a schematic side view of an engagement element mounted to a floor plate of the installation unit.

It will be understood that series of vertically spaced engagements elements 35 are preferably mounted to the installation unit 20 at locations along the periphery of the foot print F corresponding to the location of the stays 32 such that a lowermost engagement element shown in FIG. 3a by numeral 35' of each series may engage or receive a corresponding stay 32 after a rotation and subsequent lowering of the installation unit 20 by crane C. In FIG. 3a the lowermost engagement element 35' is shown as being mounted to a vertical support 22; FIG. 3d shows an alternative solution where the engagement elements 35, including the lowermost engagement element 35', are mounted to the peripheral edge of the floor plate/grating 23, such as by welding or bolts/nuts.

Shown in FIG. 3b is a general outline of the front side of one engagement element 35', wherein a hollow 36 provides for a centering of the stay 32 and a receiving by partial enclosing of a part of the length of the stay 32; two diverging leg portions 35''' provide for the above mentioned lead-in for the stay 32 as the installation unit 20 is lowered towards the upper end 33", which may have a tapered head, of the corresponding stay 32, thereby bringing about any slight rotation of the installation unit 20 that may be required to properly align the hollow 36 with the stay 32. Sliding movement of some or all of the engagement elements 35 along the stays arise when the engagement elements 35 are in contact with the stays; by design such contact may be selected to be permanent during the lowering or to only arise temporarily when wind gust or other events bring about small movements of the installation unit, out of proper alignment.

Preferably, as shown in broken lines in FIG. 3a and as also shown in FIG. 1, the upper end 33" of the stays 32 project slightly above the level of the flange 39 such that the installation unit 20 is properly aligned and the stays 32 correctly received by the engagement elements 35 already before the installation unit 20 enters the tower 10. As the installation unit 20 is lowered further into the tower 10 successive ones of the engagement elements 35 along the height of the unit 20 will engage or receive the corresponding stay 32 and move along the stay 32, in slidingly whenever contact is made.

Located inside the tower 10, preferably at a distance corresponding at minimum to the height of the installation unit 20 are inwardly directed abutment structures 9 configured for supporting the installation unit 20 when in its final position, at which time the stays 32 may be removed from the inside of the tower 10 for use in another tower 10. Preferably the stays 32 are anchored at their other end to the abutment structures 9 although stay anchors may be provided on the inside of wall 8 at other locations along the height of the tower 10, such as in connection with any additional flanges 39 located inside the tower 10 or at the tower foundation.

The stays 32 may be flexible cables mounted under tension by providing tensioning devices at one or both ends 33", or plain rods or bars, also possibly under some tension.

Figure 4A:
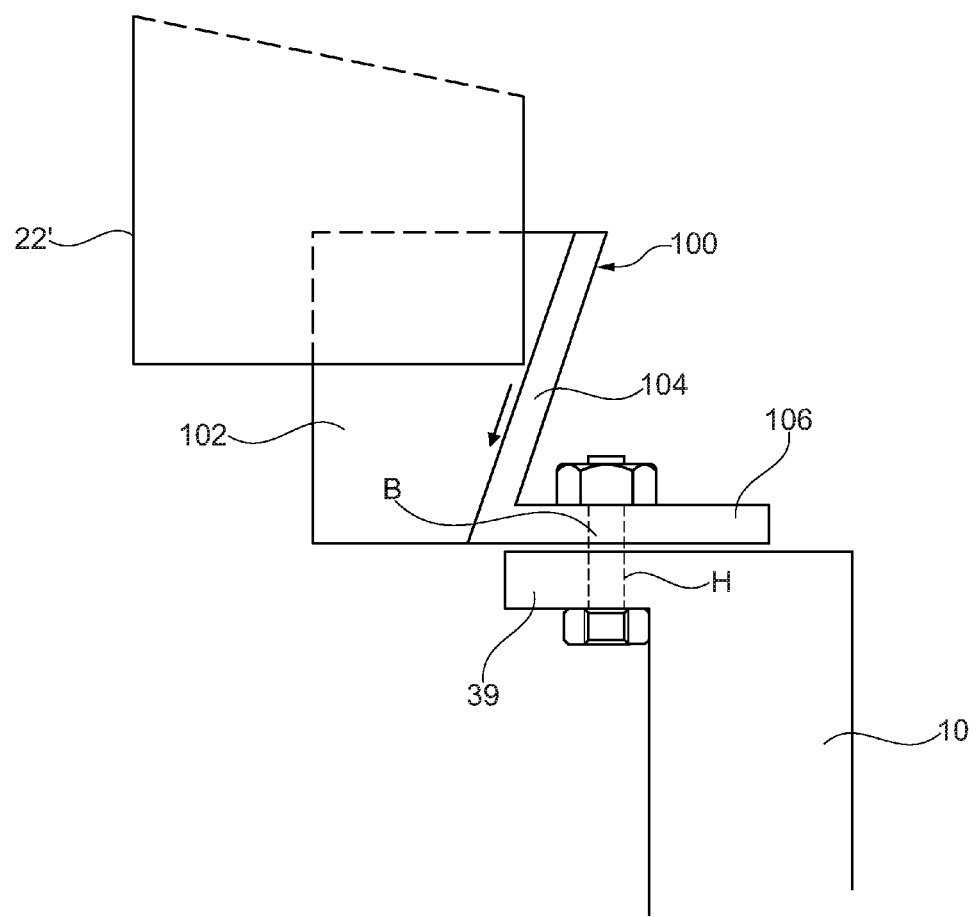
FIGS. 4a and 4b is a schematic side and top view, respectively of an installation module guiding device arranged at the tower top flange.
Figure 4B:
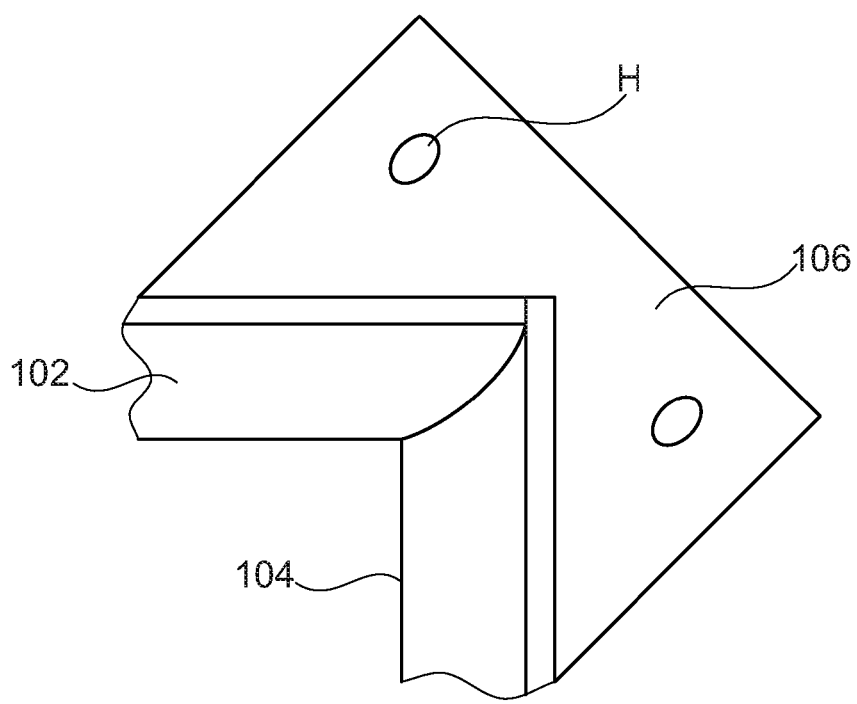

Shown in FIGS. 1 and 2 is also a pair of optional installation module guiding devices 100 mounted to the flange 39 and preferably projecting upwards therefrom. The device 100 is configured for providing an initial alignment of installation module 20 with respect to the tower 10, before the stays 32 are received by the engagement elements 35. For this purpose the device 100 is provided with a guiding face which cooperates with the unit 20, such as with a pair of diametrically opposed vertical supports 22' thereof, to correctly align the unit 20 with the entry-opening defined by the upper end 3 of the tower 10. FIG. 4a shows the device 100 as including a pair of inclined plates 102, 104 mounted perpendicularly to each other on a support plate 106 bolted to the flange 39 by bolts B extending through corresponding holes H in the flange 39 and the support plate 106. On lowering the unit 20 the lower end of the supports 22' or the unit 20 will strike the surface of the inclined plates 102, 104 and slide downwards into proper alignment with the centre line axis $CL_{10}$ of the tower 10.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A wind turbine tower with a guide system for guiding an internal installation unit displaced relative to the inside of said tower to a final mounting position inside said tower, said tower having a first end and an opposite second end, said first end defining an entry opening for receiving said unit, at least two parallel stays for said guiding being mounted to the inside of the wall of said tower and extending from said first end towards said second end, said at least two parallel stays being attached to the tower at a first location adjacent the first end and at a second location spaced from the first end and towards the second end.

2. The tower according to claim 1, a free end of said stays projecting beyond said first end.

3. The tower according to claim 1, said tower having an inwardly directed peripheral flange at said first end, said stays extending from about the level of said flange, spaced from said flange inwardly towards a centre line of said tower.

4. The tower according to claim 3, said stays being anchored to said flange.

5. The tower according to claim 1, said stays extending along diametrically opposite parts of said tower.

6. The tower according to claim 1, including inwardly oriented abutments configured for permanent support of said unit in said mounting position.

7. The tower according to claim 6, said stays being anchored to said abutments.

8. The tower according to claim 1, including tensioning devices for tensioning at least one of said stays.

9. The tower according to claim 1, at least one of said stays being a cable under tension.

10. The tower according to claim 1, said first end being an upwardly directed end of said tower.

11. The tower according to claim 1, said first end being a downwardly directed end of said tower.

12. The tower according to claim 1, being one section of a taller tower.

13. A wind turbine tower with a guide system for guiding an internal installation unit displaced relative to the inside of said tower to a final mounting position inside said tower, said tower having a first end and an opposite second end, said first end defining an entry opening for receiving said unit, said guide system comprising at least two parallel stays for said guiding being mounted to the inside of the wall of said tower and extending from said first end towards said second end, and engagement elements mounted externally on said unit, said engagement elements being configured for receiving a respective one of said stays, and said engagement elements being configured for only partially enclosing said stays.

14. The tower of claim 13, said unit having a footprint (F), said engagement elements being mounted to extend outwardly from said footprint (F), said engagement elements being mounted to a platform structure of said unit, to a vertical frame structure of said unit, and/or to a horizontal frame structure of said unit.

15. The tower of claim 13, said engagement elements having a lead-in portion for leading-in a respective stay.

16. The tower according to claim 13, a free end of said stays projecting beyond said first end.

17. The tower according to claim 13, said tower having an inwardly directed peripheral flange at said first end, said stays extending from about the level of said flange, spaced from said flange inwardly towards a centre line of said tower.

18. The tower according to claim 17, said stays being anchored to said flange.

19. The tower according to claim 13, said stays extending along diametrically opposite parts of said tower.

20. The tower according to claim 13, including inwardly oriented abutments configured for permanent support of said unit in said mounting position.

21. The tower according to claim 20, said stays being anchored to said abutments.

22. The tower according to claim 13, including tensioning devices for tensioning at least one of said stays.

23. The tower according to claim 13, at least one of said stays being a cable under tension.

24. The tower according to claim 13, said first end being an upwardly directed end of said tower.

25. The tower according to claim 13, said first end being a downwardly directed end of said tower.

26. The tower according to claim 13, being one section of a taller tower.

27. A method of mounting electrical equipment in a wind turbine tower, comprising:
   a) providing an installation unit with electrical equipment, engagement elements being mounted externally on the installation unit,
   b) advancing the installation unit towards a first end of the tower, the first end defining an entry opening for receiving the installation unit,
   c) bringing said engagement elements into contact with at least two parallel stays mounted to the inside of the wall of the tower, wherein said at least two parallel stays are attached to the tower at a first location adjacent the first end and at a second location spaced from the first end and towards a second end of the tower, and
   d) displacing said installation unit into said tower, with the engagement elements aligned with the stays.

28. The method according to claim 27, the engagement elements being configured for receiving a respective one of the stays and receiving the stays during the displacing.

29. The method according to claim 27, wherein in the step c) a free end of the stays at the first end is received by a respective engagement element.

* * * * *